Oct. 31, 1950     W. E. RUGH     2,528,477
OVERLOAD RELEASE MECHANISM
Filed Oct. 29, 1947                 2 Sheets-Sheet 1
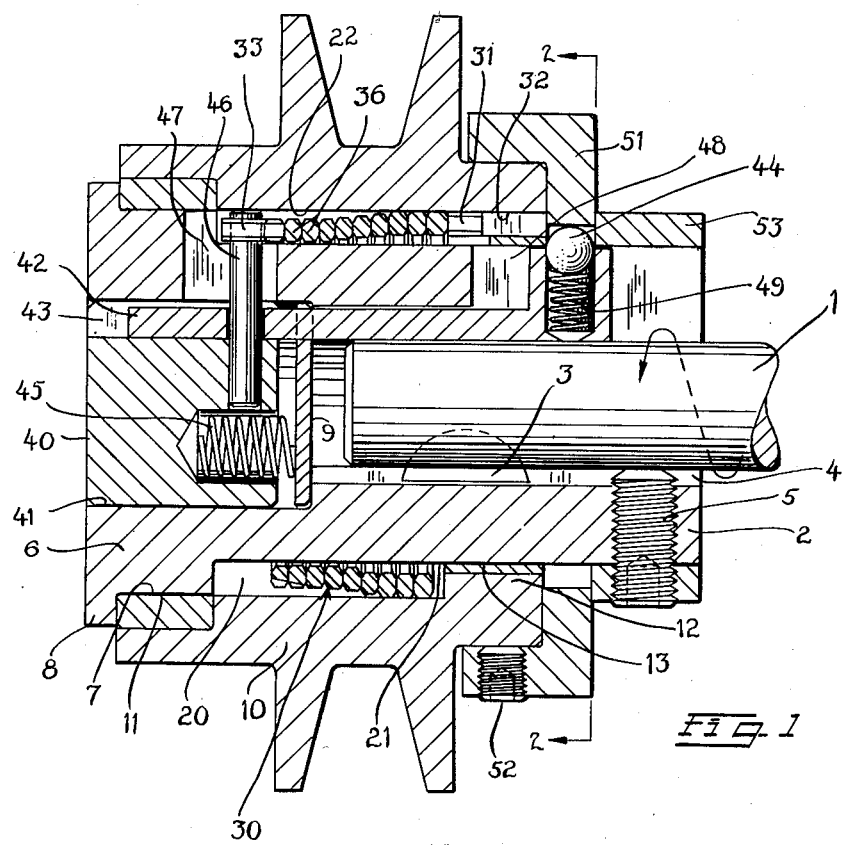
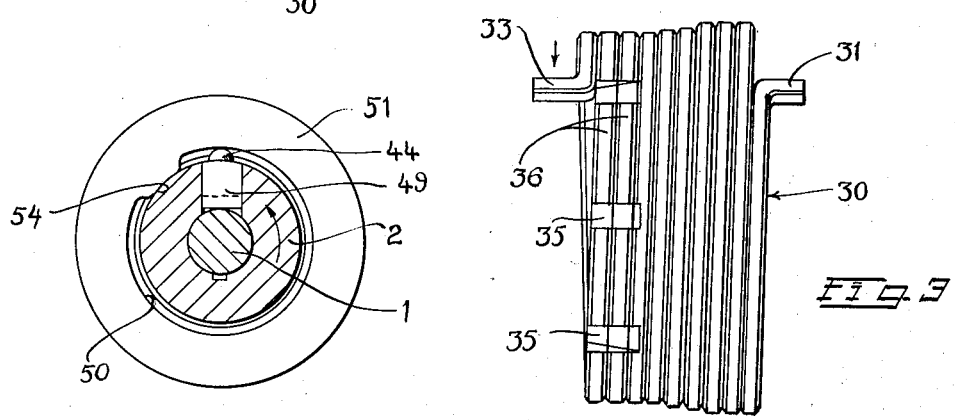
INVENTOR.
WELDON E. RUGH
BY George M. Soule
ATTORNEY

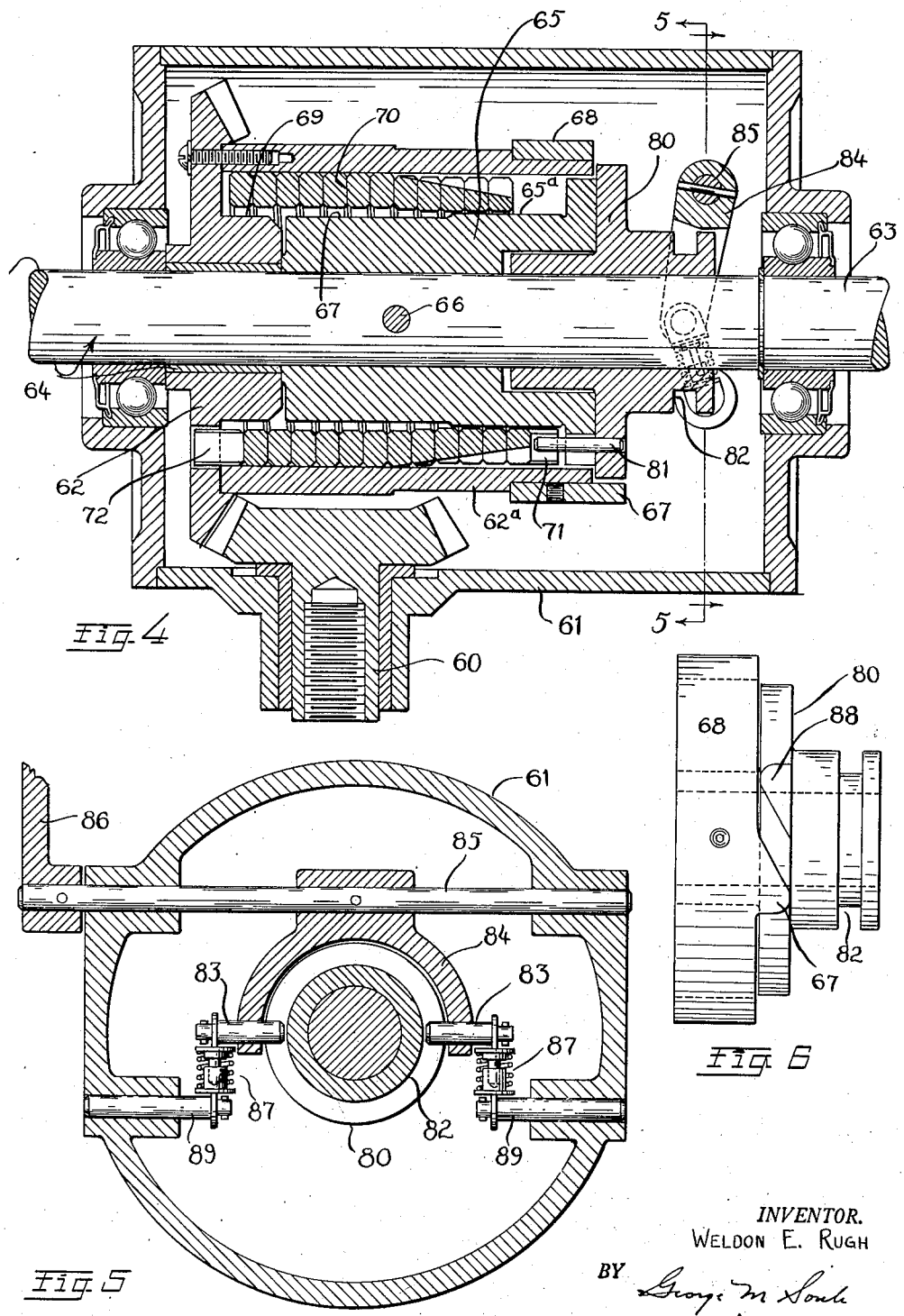

Patented Oct. 31, 1950

2,528,477

UNITED STATES PATENT OFFICE 2,528,477

OVERLOAD RELEASE MECHANISM

Weldon E. Rugh, Indianapolis, Ind., assignor, by mesne assignments, to The Marquette Metal Products Company, Cleveland, Ohio, a corporation of Ohio Application October 29, 1947, Serial No. 782,909

10 Claims. (Cl. 192—56)

This invention relates to a spring clutch mechanism embodying an overload release device for completely releasing the driving connection maintained by the clutch upon imposition of a predetermined overload.

The invention is of particular value for use in power drives that may be subjected to excessive resistance, blocking or other interference with the transmission of driving power to the driven mechanism. Examples of equipment presenting the problem are coal conveyors, stoker drives and other screw-feed type machines. Should material being handled by such equipment clog the driven mechanism, the overload release will disconnect the power drive entirely therefrom and avoid damage to the motor and/or the driven mechanism.

An object of the invention is to provide such an overload release device which may be adjusted to operate upon a predetermined overload in accordance with varying conditions of operation. Thus for normal service of a machine embodying my invention, the latter may be selectively adjusted to operate upon imposition of a low degree of overload torque, relieving wear and tear on the associated machine parts. Should circumstances make it desirable temporarily to operate the machine under greater torque loads, the release device may be readjusted to allow transmission of the greater torque, within the load limits of the clutch spring and associated parts employed.

A further object of the invention is the provision of an overload release device wherein the clutch spring serves also as the load sensitive element, being so designed that certain of its coils will transmit the load from the driving member to the coils clutching the driven member. These load sensitive coils are capable of gradually absorbing a greater load to a predetermined limit, or of absorbing a sudden imposition of full overload torque at which the overload release will operate to sever the driving connection, as determined by its adjustment.

Manual operation of the overload release device is provided by which driving connection between the power source and the driven mechanism may be initiated or disconnected at will and by which such connection is remade after automatic disconnection due to overload conditions.

Other objects and features of the invention will become apparent from the following description of the preferred forms shown in the drawings.

Fig. 1 of the drawings is a vertical longitudinal section through a spring clutch mechanism embodying a preferred form of my overload release device; Fig. 2 is a reduced-scale cross-section taken on the line 2—2 of Fig. 1; Fig. 3 is a side elevation of the clutch spring employed in the mechanism of Fig. 1; Fig. 4 is a vertical longitudinal section through a spring clutch mechanism embodying a modified form of my overload release device; Fig. 5 is a cross-section taken on the line 5—5 of Fig. 4; and Fig. 6 is a plan view of the cam mechanism embodied in the device of Fig. 4.

With reference to the drawings, Figs. 1 to 3 inclusive illustrate one form of my invention wherein 1 indicates a driving shaft which may be connected to any suitable source of driving power (not shown). Adapter sleeve 2 is secured to shaft 1, in any conventional manner as by key 3, keyway 4 and set screw 5, for rotation with the shaft. Sleeve 2 has a cylindrical outer surface 21 and terminates at its left-hand end in a stepped flange portion 6.

Rotatably mounted upon sleeve 2 is pulley member 10 having a bearing sleeve portion formed at one end with bearing surface 11 cooperating with bearing surface 7 formed by the stepped flange 6 of sleeve 2. At its opposite, right-hand end the pulley member has an inwardly projecting flange portion 12 forming a bearing surface 13 for cooperation with the outer cylindrical drum surface 21 of sleeve 2. End step 8 of flange 6 abuts the end surface of the bearing sleeve portion of pulley 10, serving as an endwise retainer to prevent axial movement of pulley 10 to the left. A cam collar 51, adapted to fit against the right-hand end of pulley member 10, is adjustably secured thereto by set screws 52 and rotates therewith. A retaining ring 53, abutting collar 51, is secured to sleeve 2 by set screw 5 and holds the rotatable pulley 10 and collar 51 against endwise or axial movement to the right.

A recess 20, formed between the inner cylindrical bore of pulley 10 and the outer cylindrical clutch surface 21 of sleeve 2, receives a clutch spring 30 therein. Spring 30 (see Figs. 1 and 3) is generally cone-shaped, comprising coils which progressively increase in diameter toward the right from the energizing end 36 thereof to its load-sensitive coils, the last of which terminates in an axially extending toe 31. Spring 30 is anchored to pulley member 10 for rotation therewith, its toe 31 being secured in pocket 32 formed in the pulley member. The last coil at the energizing end of the spring terminates in an axially extending toe 33 for circumferential abutment with an energizing pin 46, as will be described hereinafter.

The outer, left-hand end of sleeve 2 has an enlarged bore 41 receiving a control button 40, axially movable therein. A spring 45, located in an eccentric axial pocket formed in button 40, abuts a plate 9 at the bottom of bore 41 and urges the button outwardly to the left from the position shown in Fig. 1. A key member 42, located in keyway 43 formed in sleeve 2 and button 40, is axially movable conjointly with the button. Energizing pin 46 is carried by button 40 and extends radially therefrom through an opening in key 42, operably connecting the key and button. The end of the pin 46 extends through an axially extending slot 47 formed in sleeve 2 and into recess 20 for engagement with the toe 33 of spring 30 located in the recess. At its right-hand end key 42 has a radially extending portion 49, operating within a slot 48 formed in sleeve 2 similar to and in alignment with slot 47. A spring loaded ball 44, carried in a radial bore of key portion 49, cooperates with the inner surface 50 of cam collar 51 mounted on pulley member 10. The major portion of the inner peripheral surface 50 (see Fig. 2) against which ball 44 is forced by its spring is of a diameter larger than the drum surface 21 of sleeve 2 to form, with the adjacent inner projection 12 of pulley 10 and ring 53, a circular channel having a depth sufficient freely to receive approximately half of ball 44. The latter, urged outwardly into said channel, thus serves as a releasable locking member or latch to hold the energizing assembly, comprising key 42, button 40 and energizing pin 46, to the left. When pulley 10 and its associated cam collar 51 fails, due to overload, to turn with sleeve 2, the inwardly projecting cam surface 54 of the collar engages ball 44, depressing it out of engagement within the channel formed in part by the surface 50 and into a position where it can ride under bearing surface 13 of pulley 10 and permit axial movement of the energizing assembly to the left as urged by spring 45. In this manner spring toe 33 is released from engagement by energizing pin 46 allowing the spring to expand and release its grip upon the clutching surface.

Operation

With shaft 1 rotating in the direction of the arrow (see Fig. 1), button 40 is depressed by any suitable means (not shown) to move the energizing assembly to the right into the position illustrated in Fig. 1. The assembly is latched in the right-hand position by the ball 44 entering the channel, as described above. In this position, pin 46 is in position to engage the spring toe 33, the energizing assembly being rotated together with the shaft 1 and sleeve 2 and the spring being stationary by reason of its engagement with pulley 10. Upon this engagement of the pin and spring toe 33 the spring coils adjacent the toe begin to contract into clutching engagement with drum surface 21. When a number of the spring coils have thus engaged the surface 21, the remaining coils of the spring, acting as torsion coils, will take up the load and transmit it through toe 31 to pulley 10. The number of coils which will engage the surface 21 will depend upon the construction and design of the spring 30 and upon the immediate load imposed thereon. The clutching engagement of the coils adjacent the toe 33 serves to relieve the frictional engagement between pin 46 and the toe so that only a slight force will be necessary to move pin 46 out of engagement with the toe when the releasing mechanism is actuated, this force being produced by spring 45.

Spring 30 is so designed as to comprise in effect a group of energizing coils, preferably slotted or otherwise rendered more flexible than the remaining coils, a group of clutching coils, and a group of torsion coils. The energizing coils, upon engagement of the energizing toe by pin 46, engage clutching surface 21 and begin a progressive contraction of its adjacent coils. The number of coils other than the energizing coils which will contract into engagement with the clutching surface will vary in accordance with the load imposed. Under normal load, however, only a few of these coils will be in such engagement, the remainder of the coils transmitting the torque from the driving member to the pulley, through the toe 31.

If desired, toe 31 may be reinforced in some manner, such as by pinning or welding a lug thereto. Further, the normal diameter of the coils adjacent the toe 31 may be slightly greater than the inner diameter of the pulley member forming the outside wall of recess 20 so that the spring is expanded therein into clutching engagement with the pulley, thus relieving the stress imposed on the toe 31.

The last-mentioned group of torsion coils which transmit the torque to the pulley member from the coils engaging the clutching surface 21 do not ordinarily contract into engagement with the sleeve 2. However, as the load imposed varies, these coils may gradually and progressively contract and expand, during which action a limited relative angular movement of the pulley 10 and sleeve 2 occurs. Upon imposition of the predetermined torque at which the device is intended to release, as determined by the setting of the adjustable cam collar, such relative angular movement has become of such degree as to bring cam projection 54 into position for engaging ball 44, at which time the energizing assembly moves to the left and de-energizes the spring, releasing the driving connection between the driving sleeve and the pulley.

To re-establish such driving connection, button 40 is again depressed, moving the energizing assembly back to the right, where it will be held by the ball 44 engaging in its channel. In this position the pin 46 will again be in position to energize the spring, and driving relation is re-established until recurrence of overload condition. It is apparent that if the overload condition has not been corrected when the button 40 is thus depressed, the above sequence of movements will be repeated until no overload is imposed.

The torque required for operating the release device may be adjusted through selective positioning of collar 51 upon pulley 10 to vary the relative circumferential positions of cam projection 54 with reference to the energizing key assembly when the device is operating under normal load condition. By thus varying this distance, the angular relative rotation of the sleeve and pulley required to bring the cam projection 54 and ball 44 into engagement is varied; and the torque at which the release will operate increases as this distance is increased. Upon adjustment, collar 51 is held in adjusted position by tightening the set screws 52.

Figs. 4 to 6 inclusive illustrate a modified form of my overload release device wherein the power source (not shown) is connected to a gear member 60 rotatably supported in housing 61. Gear 60 meshes with gear teeth formed on a driving member 62 and drives the rotary parts of the mechanism in the direction indicated by the arrow on the driven shaft 63. Driven shaft 63, mounted in suitable bearing structures carried by the housing 61, supports driving member 62 for relative rotation thereon, friction sleeve bearing 64 being interposed therebetween. Sleeve member 65, abutting driving member 62 and fixed to shaft 63 as by a pin 66 for rotation therewith, has an external clutching surface 67 formed thereon. Peripherally adjacent thereto is a cone-shaped spring 70, similar in form and design to spring 30 described and illustrated with reference to Figs. 1 and 3. For operation in the indicated direction (arrow on shaft 63) the spring is right hand wound. A cylindrical barrel 62a rigid with the driving member 62 extends therefrom substantially the length of sleeve 65 and surrounds spring 70. Energizing element 80 is mounted on shaft 63 for rotation with the barrel and sleeve 65 at the end of the latter opposite driving member 62 and adjacent the end of its barrel or extension 62a. Element 80 is axially movable with respect to the barrel and sleeve 65, and carries an axially extending energizing pin 81. This pin 81 extends through a suitable slot in an outwardly extending radial flange portion of sleeve 65 at its end adjacent element 80, the end of the pin entering the spring receiving recess formed between sleeve 65 and the barrel 62a. Spring 70 has a toe 72 at its larger end which enters a pocket formed in driving member 62, whereby the spring will always rotate with said member. An axially extending energizing toe 71 is formed on the opposite end of the spring with which pin 81 will engage during initial partial turn of the driving member and spring with reference to the then stationary pin 81, assuming the element 80 is in its left-hand position shown in Fig. 4. To drive the sleeve 65 the clutch spring coils near the energizing toe 71 are first contracted against a somewhat enlarged clutching surface portion 65a of the sleeve and further wrapped on the sleeve during increased torque resistance.

The hub formed on energizing element 80 has a circumferential channel 82 therein for cooperation with the arms of a shifting yoke 84, the latter being secured to and supported by an operating rock shaft 85. The rock shaft 85 is supported by housing 61, as shown in Fig. 5, and has an arm 86 or other means attached thereto for operating the yoke 84. Coaxial pins 83 mounted in respective arms of the yoke 84 engage in the channel 82 and are connected by compression-spring-biased toggle members or assemblies 87 to coaxial pins 89 mounted in the housing 61 directly below the rock shaft. The toggles 87 urge the lower end of the yoke and consequently the element 80 to the left or right of the common plane of the axes of the rock shaft 85 and pins 89. The active position of the element 80 is as illustrated in Fig. 4 with the toggle and yoke connecting pins to the left of said plane. The toggle mechanism may be shifted from one position to the other by manipulation of the arm 86, or by automatically acting remote-control means not shown.

A cam projection 88 (Fig. 6) formed on the outer periphery of energizing element 80 is arranged to engage a cam projection 67 formed on a collar 68 adjustably mounted on the end of the barrel 62a of driving member 62, when the element 80 is in operating position, Figs. 4 and 6. When relative angular movement of the barrel 62a and sleeve 65 occurs, due to imposition of overload causing slippage of the clutch, the cams 67 and 88 are brought into engagement, forcing element 80 to the right, whereupon the toggles 87 act to move the element 80 farther in that direction and prevent its return. That disconnects the pin 81 from the energizing toe of the spring and renders the clutch device inactive by releasing all the spring coils from gripping contact with the sleeve 65.

In the form of device just described, the stress imposed on the toe 72 engaging the driving member 62 may be relieved either by reinforcing the toe or by slotting or reducing the effective section of the first one or two coils of the spring adjacent the toe, whereby those coils will more readily contract to clutch the outer drum surface 69 of the projecting hub of driving member 62 at approximately the same time as the energizing coils at the opposite end of the spring engage the clutching surface 65a formed on sleeve 65. Also the coils radially adjacent the surface 69 can be so wound as initially to grip the hub by being in interference fitting relationship therewith. In any such case, the intermediate coils will still be free to act in their capacity as load sensitive torsion coils, as described in connection with the device illustrated in Figs. 1 to 3, transmitting the torque from the coils clutching the external drum surfaces 65a or 67 of sleeve 65 to driving member 62 and providing for fluctuations of torque below the release torque.

The modified form (Fig. 4) of the device may not be maintained in a loaded condition when an overload is imposed. The element 80 cannot be manually shifted into energizing position and maintained there under such overload because said element will be immediately moved out of that position by the positive action of the cams 67 and 88. This is of particular advantage when the device is to be used by untrained personnel or when it is employed in an installation where it does not receive constant supervision. However, in the form illustrated in Figs. 1 to 3 the operator may, if he chooses, keep the control button 40 depressed, even in presence of overload with the view to removing the overload by repeated power impulses thereon.

An application of W. C. Starkey, Serial No. 685,468, filed July 22, 1946, entitled "Overload Release Device" is hereby recognized as prior art.

I claim:

1. A spring clutch device including axially aligned driving and driven members, one of said members having a clutch engaging surface, a clutch spring normally out of clutching engagement with said surface and connected for co-rotation with the other of said members, energizing means for engaging a coil of the spring to move the spring into clutching engagement with said surface and rotatively connect said members, said spring embodying load sensitive torsion coils free to move radially in one direction to enable yieldingly resisted relative angular movement between said members upon imposition of overload, and releasing means for the energizing means actuated upon an amount of relative angular movement between said members and operating on the energizing means to cause the spring to move out of clutching engagement.

2. A spring clutch device including axially aligned driving and driven members, one of said members having a clutch engaging surface, a clutch spring normally out of clutching engagement with said surface and connected at one end to the other of said members, energizing means for engaging the other end of said spring to move it into clutching engagement with said surface and operably connect said members, said spring embodying load-sensitive torsion coils permitting relative yieldingly resisted movement between said members upon imposition of overload, and adjustable means actuated by a predetermined degree of relative angular movement between said members and operably connected to said energizing means for de-energizing the spring.

3. An overload release mechanism including a driving member and a driven member, one of said members having a clutch engaging surface, a clutch spring having a clutching coil portion normally out of clutching engagement with said surface, energizing means movable into energizing engagement with the clutching portion of the spring for causing it clutchingly to engage said surface, said spring having a load-sensitive non-clutching coil portion of different diameter from that of the clutching coil portion and connected for co-rotation with the other member, arranged for free radial and winding movement, said load sensitive portion enabling relative angular displacement of said members upon imposition of overload while the clutching coil portion of the spring is engaged with said surface, and means actuated by said relative angular movement to move said energizing means out of engagement with said spring for releasing the spring from clutching engagement with said surface.

4. An overload release mechanism including a driving member and a driven member, one of said members having a clutch engaging surface, a clutch spring normally out of clutching engagement with said surface, energizing means movable into energizing engagement with the spring for causing the spring clutchingly to engage said surface, said spring embodying a load-sensitive torsion coil connected with the other of said members yieldingly to permit relative angular movement between said members upon imposition of overload while the spring is clutchingly engaged with said surface, and means actuated upon predetermined relative angular movement of said members to move said energizing means and cause disengagement of the spring with said surface.

5. An overload release mechanism including a driving member and a driven member, one of said members having a clutch engaging surface, a clutch spring connected for rotation with the other member and normally out of clutching engagement with said surface, energizing means and a biasing spring therefor, said energizing means being settable against the force of the biasing spring into energizing engagement with the clutch spring for causing it clutchingly to engage said surface, said means including a holding latch for storing energy in the biasing spring, load-sensitive means arranged yieldingly to permit relative angular movement between said members upon imposition of overload without releasing the clutching engagement of the spring, and latch releasing means actuated by and consequent upon taking place of said relative angular movement for enabling said energizing means to be moved by its biasing spring out of operative engagement with said clutch spring.

6. An overload release mechanism including two aligned torque-transmitting members, one member having a clutch engaging surface, a clutch spring connected for rotation with the other member and normally out of clutching engagement with said surface, energizing means for the spring movable to active and inactive positions, said spring embodying a load-sensitive coil yieldingly to permit relative angular movement of said members upon imposition of overload while the spring is clutchingly engaged with said surface, a cam carried by one of said members, and cam actuated means connected with the energizing means for moving the same to inactive position upon a predetermined degree of relative angular movement of said members.

7. An overload release mechanism including two aligned torque-transmitting members, one member having a clutch engaging surface, a clutch spring connected for rotation with the other member and normally out of clutching engagement with said surface, energizing means for the spring carried by said one member and movable to active and inactive positions, means arranged yieldingly to permit relative angular movement of said members upon imposition of overload while the spring is clutchingly engaged with said surface, cam means carried by one of said members, cooperating cam means connected with the energizing means for moving the same to inactive position upon a predetermined degree of relative angular movement of said members, the two cam means being relatively adjustable to determine the degree of relative angular movement necessary to release the spring from clutching engagement.

8. Mechanism according to claim 7 wherein said cooperating cam means is yieldably arranged so that the operation of the first cam means may be overcome and torque transmission through both members continued notwithstanding such relative angular movement.

9. Mechanism according to claim 6 wherein an over-center toggle mechanism holds the energizing means in one of its positions.

10. An overload release mechanism including driving and driven members, one having a clutch engaging surface, a clutch spring wound with progressively expanding coils normally out of engagement with said surface, the spring being connected at one end for co-rotation with the other member, energizing means movable into and out of engagement with the opposite end of said spring to energize certain of the spring coils into clutching engagement with said surface, others of the spring coils being of different diameter from the clutching coils and serving as load-sensitive coils for allowing limited relative angular movement of said members upon imposition of overload and without releasing the clutching engagement, and means caused to be operated by said angular movement for operating the energizing means to release the spring from clutching engagement.

WELDON E. RUGH.

REFERENCES CITED

The following references are of record in the file of this patent:

UNITED STATES PATENTS

| Number | Name | Date |
|---|---|---|
| 1,498,320 | Hayes | June 17, 1924 |
| 1,555,984 | Karge et al. | Oct. 6, 1925 |
| 1,984,297 | Abel | Dec. 11, 1934 |
| 2,289,884 | Raber | July 14, 1942 |
| 2,459,972 | Starkey | Jan. 25, 1949 |